United States Patent [19]

Ramaswamy

[11] Patent Number: 4,614,662

[45] Date of Patent: Sep. 30, 1986

[54] FAST COOK-CONTINUOUS PROCESS FOR PRODUCTION OF AMMONIA CARAMEL COLOR

[75] Inventor: Setlur R. Ramaswamy, Louisville, Ky.

[73] Assignee: D.D. Williamson & Co., Inc., Louisville, Ky.

[21] Appl. No.: 769,611

[22] Filed: Aug. 26, 1985

[51] Int. Cl.⁴ ............................................. A23G 3/32
[52] U.S. Cl. .................................. 426/540; 426/442; 426/474; 426/658; 127/34; 127/1
[58] Field of Search ............... 426/250, 540, 648, 442, 426/474; 127/34, 1

[56] References Cited

U.S. PATENT DOCUMENTS

| | | | |
|---|---|---|---|
| 2,582,261 | 1/1952 | Longenecker | 127/34 |
| 2,767,108 | 10/1956 | Fetzer | 127/34 |
| 2,784,118 | 3/1957 | Pyle et al. | 127/34 |
| 3,214,294 | 10/1965 | Meisel | 426/250 |
| 3,385,733 | 5/1968 | Ackermann | 127/34 |
| 4,138,271 | 2/1979 | Ohira et al. | 127/34 |

FOREIGN PATENT DOCUMENTS 696736 9/1953 United Kingdom ................. 127/34

*Primary Examiner*—Jeanette Hunter
*Attorney, Agent, or Firm*—Wood, Herron & Evans

[57] ABSTRACT

Ammonia caramel coloring is formed continuously by pumping a heated stream of corn syrup through a reaction zone under pressure. 4MeI content and THI content are maintained at a low level by preheating the ammonia catalyst prior to injection into the reaction zone. Preferably ammonia catalyst is added to the reaction zone at a plurality of injection ports. This permits rapid formation of ammonia caramel coloring without increasing the 4MeI of THI content, and without hazing of the caramel color.

30 Claims, 1 Drawing Figure

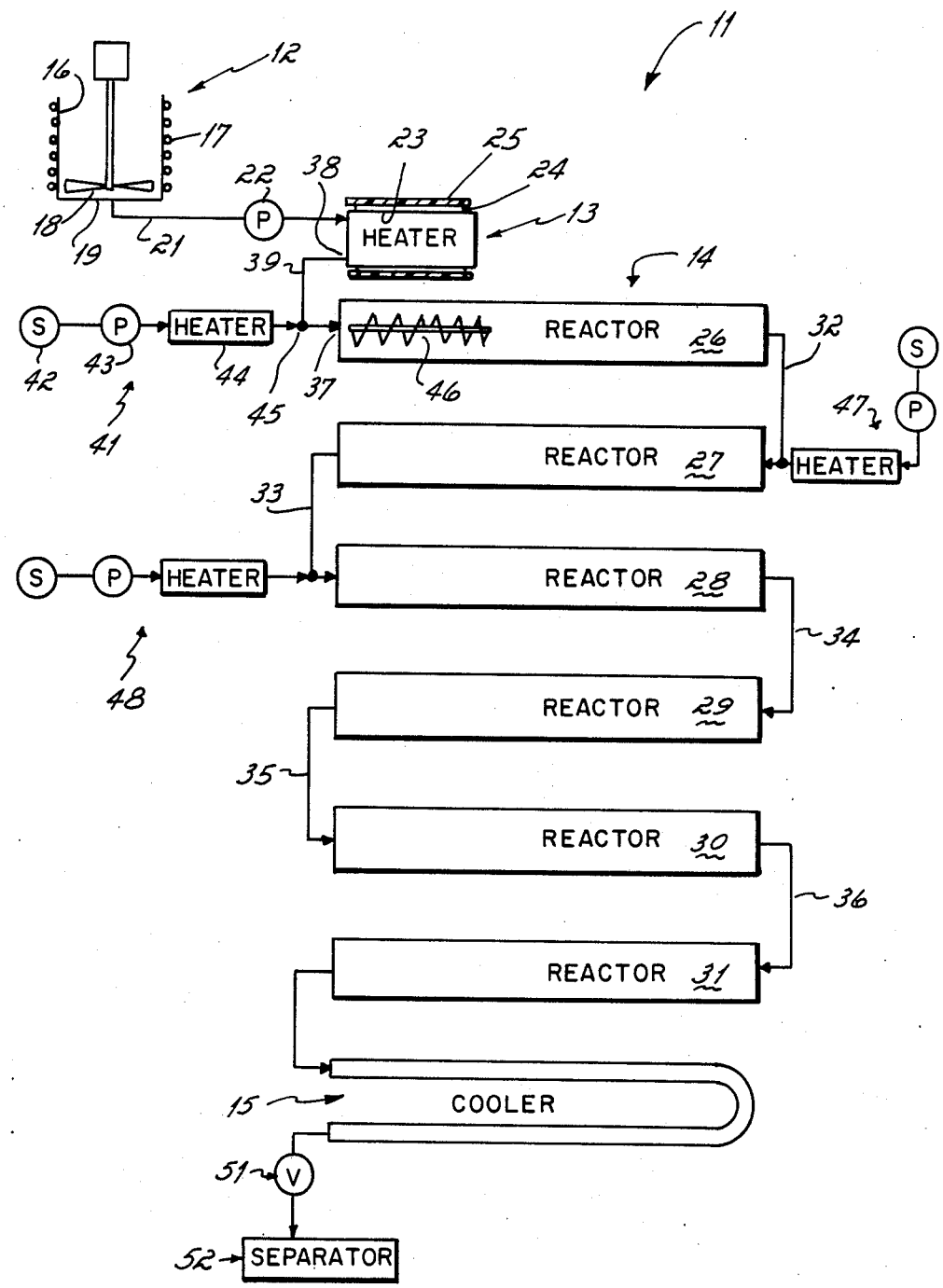

FAST COOK-CONTINUOUS PROCESS FOR PRODUCTION OF AMMONIA CARAMEL COLOR

BACKGROUND OF THE INVENTION

Caramel color is a product of the heat treatment of carbohydrates, typically sugars, usually in the presence of a catalyst. There are several types of caramel colors, for example, non-acid resistant and acid resistant types. The different types of caramel colors are chosen for their suitability for a particular end use. With soft drinks, acid-resistant type caramel colors are required. Malt beverages such as beer require non-acid resistant caramel. Non-acid-resistant caramel color particularly suitable for malt beverages and which is salt stable is produced using an aqueous ammonia or anhydrous ammonia catalyst. This is referred to as ammonia caramel color.

Ammonia caramel color is generally produced using a batch type process. In a batch type process a large kettle containing up to 2000 gallons or more of a carbohydrate such as corn syrup is heated to boiling for about 8 to 12 hours. Gradually the ammonia catalyst is added and the color forms. This is then slowly cooled and filtered and brought to the desired concentration.

The batch process has several inherent problems. Since there is such a large mass of material, it is difficult to control the process conditions. The batch can burn and form an irreversible gelatinous mass which must be discarded and constitutes waste of the entire batch. Batch reactors also require a large capital investment to provide a reaction vessel suitable to hold such a large volume. Further the period of time required for a batch process is excessive.

This time period could be reduced by increasing the reaction temperature which will increase the reaction rate. In order to do this, however, increased pressure is required. Such increased pressure causes hazing of the caramel thereby providing an unacceptable caramel color.

A problem with caramel color is the production of 4-methyl imidazole (hereafter 4MeI) and 2-acetyl-4(5)-tetrahydroxy butyl imidazole (hereinafter THI). Over the past several years the Food and Drug Administration has limited the content of 4MeI in caramel color and THI content may soon be limited. It is believed that 4MeI and THI are reaction products of the carbohydrates in combination with the ammonia catalyst. To conduct the production of 4MeI and THI the ammonia catalyst must be added to the batch reactor very slowly. This is particularly difficult to control accurately; and even with this slow addition of the ammonia catalyst, unacceptably high levels of 4MeI and THI are sometimes encountered. Such high levels can require discarding of an entire batch of caramel color.

Although apparently never commercially developed, methods have been disclosed to produce caramel color in a continuous manner under high pressure. For example, Meisel U.S. Pat. No. 3,214,294 and Ackermann U.S. Pat. No. 3,385,733 disclose continuous methods of producing caramel colorings. The Ackermann reference teaches forming a mixture of catalyst and polysaccharide syrup preferably corn syrup, preheating this to a temperature of 350° F. to 1,000° F., maintaining this reaction mixture in a continuous reactor under pressure for a period of 5 to 300 minutes. Various catalysts including phosphoric and sulfuric acids and ammonium, potassium or sodium hydroxide are disclosed. Meisel also discloses using ammonium bisulfite as a catalyst. These methods are only for acid resistant caramel colors.

Ammonia caramel produced according to the teachings of Meisel or Ackermann would have excessively high 4MeI and THI contents and further hazing would occur causing an unacceptably cloudy product.

SUMMARY OF THE INVENTION

The present invention is premised on the realization that ammonia caramel color can be produced continuously (as opposed to batch processing) by pumping a stream of carbohydrate syrup into a continuous reactor, heating the syrup to a temperature high enough to cause caramelization, maintaining the caramel at a high pressure and adding a caramelization catalyst such as either ammonia or ammonium hydroxide to the continuous reactor at a plurality of injection locations. At each injection location only a portion of the desired catalyst is added to the flowing stream of syrup. The amount added at any one location is controlled to prevent the pH of the syrup reaching any higher than about 6 or 7. The total amount of catalyst added at all of the injection locations combined is controlled to be the desired amount of catalyst to effect appropriate caramelization. A mixer is located at each injection location within the continuous reactor for agitating the syrup with the catalyst to insure an even reaction.

By heating the temperature of the syrup to about 310° to 320° F. under pressure the reaction time can be reduced to about 10 minutes. By adding the catalyst at a plurality of locations under controlled conditions the 4MeI and THI content is maintained at acceptably low levels and hazing is surprisingly prevented.

Further, the present invention is premised on the realization that in a continuous high temperature and high pressure method of forming ammonia caramel color, 4MeI and THI content can be reduced by preheating the ammonia catalyst prior to injecting it into a carbohydrate syrup. This further prevents hazing and provides a caramel color in a relatively short period of time.

Surprisingly, all the advantages of a continuous process can be realized even though one would expect a high pressure ammonia caramel process to produce a hazy caramel color with unacceptably high 4MeI and THI contents.

The advantages of the present invention will be appreciated in light of the detailed description and drawing in which:

BRIEF DESCRIPTION OF DRAWING

The FIGURE is an illustrative diagram partially in cross section of the process of the present invention.

DETAILED DESCRIPTION

According to the present invention ammonia caramel coloring is produced by reacting a carbohydrate syrup with an ammonia catalyst in a continuous heated pressurized reactor. In the present invention any carbohydrate source normally used to produce caramel can be used. These carbohydrates (normally disaccharides or polysaccharides) include corn syrup, sucrose, dextrose, invert sugar, molasses or malt syrup. Normally corn syrup is used. Preferably the syrup is a food grade syrup.

The method of the present invention permits utilization of syrup having a dextrose equivalent (DE) of below 80, and even as low as 70, 60 or 50 DE.

These syrups are heated to above their boiling point (at ambient pressure) and reacted in the presence of a heated ammonia catalyst at elevated pressure as they are pumped through a continuous tubular reactor. Confinement within the reactor under elevated pressure maintains the water in the syrup in the liquid phase. Specific ammonia catalysts include anhydrous ammonia gas and aqueous ammonia, i.e. ammonium hydroxide. The catalyst and saccharide syrup are reacted in a continuous heated pressurized reactor which is shown diagrammatically in the FIGURE. The reactor maintains the water in the syrup in the liquid phase (i.e., the saturation pressure) and provides sufficient residence time for caramel color formation.

The reactor 11 includes a preheater 12 which heats the syrup to form a pumpable fluid, an in-line tubular heater 13 designed to heat the syrup up to the appropriate reaction temperature, a series of tubular reactors 14 and a cooler 15 all connected in series.

The preheater 12 is an open stainless steel container 16 wrapped with steam heating coils 17. A mixer 18 is provided simply to promote heat flow within the stainless steel container 16. Bottom 19 of container 16 communicates via a tube 21 with a pump 22 which directs fluid to the in-line tubular heater 13. The in-line tubular heater 13 is preferably a stainless steel tube 23 wrapped with a resistance heating element 24 (or alternately a steam jacket) and insulation 25. Heater 13 is mounted in-line between the pump 22 and the tubular reactors 14.

The tubular reactors 14 form a continuous tubular reaction zone adapted to maintain the carbohydrate syrup under elevated pressure and permit catalyst injection at a plurality of locations. In this reaction zone the color formation occurs. In order to use less space the reaction zone is formed from six tubular reactors 26, 27, 28, 29, 30 and 31 connected in series by tubular "U" joints 32, 33, 34, 35 and 36. A first tubular "U" joint 39 connects an inlet end 37 of the first tubular reactor 26 to the outlet end 38 of the heater 13. Tubular "U" joint 39 includes a catalyst injector 41. The catalyst injector 41 includes a source of catalyst 42 and a metering pump 43 which forces catalyst through an in-line heater 44 into "U" joint 39 via catalyst injection port 45.

The inlet end 37 of reactor tube 26 includes a static inline mixer 46 such as a Kenics brand mixer. This mixer is simply a spiraled piece of metal which has alternating left and right hand twists. The mixer 46 rests in the inlet end 37 of the reactor 26.

First tubular reactor 26 is connected to the remaining six reactor tubes 37-31 via the "U" joints 32-36. The 2nd and 3rd "U" joints 32 and 33 also include catalyst injectors 47 and 48 which are substantially the same as catalyst injector 41. Further tubular reactors 27 and 28 also include static mixers (not shown) at their inlet ends.

U joints 34-36 may include catalyst injectors but this is unnecessary and generally not preferred unless the catalyst is injected at a lower or ambient temperature. In this situation the catalyst must be added in smaller amounts requiring more injectors.

The final or 6th reactor 31 connects to the cooler 15. The cooler 15, which is a water jacketed tube, is connected inline between the 6th tubular reactor 31 and a discharge valve 51. The valve 51 discharges into a gas liquid separator 52. The valve 51 is used to control the internal pressure of the reactor.

In one embodiment the reactor tubes are each 10 feet in length having a one inch internal diameter. The static mixers are each one foot in length. It is possible of course to increase or decrease the length, number and diameter of the tubular reactors as long as under reactor conditions (flow rate, temperature, pressure and reaction time), the proper amount of color development takes place.

According to the process of the present invention, food grade carbohydrate syrup such as corn syrup is added to the preheater 12 where it is heated to a temperature of at least about 200° F. although it can range up to 330° F. Pump 22 draws the heated syrup from the preheater 12 and pumps it into the in-line heater 13 which in turn heats the syrup to 250° F. to 350° F. (at least above the ambient boiling point of the syrup) and preferably 310° F. to 320° F. The pump 22 creates a flowing stream of carbohydrate syrup which passes from the heater 13 through the U joint 39 into the first tubular reactor 26. At the U joint 39 a first portion of the ammonia catalyst is injected into the flowing stream of carbohydrate syrup.

The catalyst is drawn from the supply tank 42 and passed through in-line heater 44 and into the tubular reactor 26 through the injection port 45. The catalyst is heated to at least the temperature of the syrup. Preferably the catalyst is heated to from about 300° F. to about 330° F. prior to injection. The syrup then passes through the first tubular reactor 26 which in this case is approximately 10 feet in length and through second U joint 32 to the second tubular reactor 27. Again catalyst is injected into the second reactor tube 27 by a second catalyst injector 47. The temperature of the catalyst is again established at about 300° F. to 330° F. The syrup passes through the third U joint 33 where heated catalyst is again added and then into the third tubular reactor 28. The syrup passes seriatim through the fourth, fifth and sixth tubular reactors 29–37.

Catalyst injectors 41, 47 and 48 control the rate of addition of catalyst. The total amount of ammonia catalyst which needs to be added will of course vary depending upon desired color formation. Generally, if aqueous ammonia is added (28% NH$_4$OH by weight and 0.9 specific gravity) to a corn syrup solution (80% solids 1.4 specific gravity) the volume to volume ratio of aqueous ammonia to syrup will be about 30/70. One third of the desired amount of catalyst is added at each injection port. The reactor tubes combined act to create a long reaction zone to provide the required reaction time for color development. It is preferred that all of the ammonia catalyst be injected within the first 80% of the reaction zone. More preferably, the catalyst should all be injected within 50 to 70% of the reaction zone. In the present invention, the length of the reaction zone is basically interchangeable with reaction time. This is because the flow rate through the reaction zone is constant. Accordingly, all of the catalyst should be injected within the first 80% of the reaction time and preferably within the first 50% to 70% of the reaction time.

The reaction time, i.e. the time the syrup is maintained at the elevated temperature and pressure will vary from about 1 to about 100 minutes or more depending on the reaction temperature and desired color formation. More typically the reaction time will be 5–15 minutes. If the catalyst is not heated, it is critical that not all of the ammonia be injected at any one injection port. Preferably the total amount of ammonia injected at any one injection point will not be more than that which would raise the pH of the carbohydrate syrup to 6 or at most 7 (preferably about 5). If the catalyst is heated to at least about 300° F. more catalyst can be added at fewer injection ports.

After passing through the sixth tubular reactor 31, the stream of saccharide syrup passes through the in-line cooler 15. The in-line cooler 15 is simply a water jacketed stainless steel tube which preferably reduces the temperature of the stream of syrup while maintaining the pressure. Preferably the cooler will reduce the temperature to about 180° F. After passing from the cooler the syrup which now is developed into a caramel color passes through valve 51 to a gas liquid separator. Control of the valve acts to maintain the internal pressure at a desired state.

Generally the internal pressure of the reaction zone will be maintained by the pressure release valve at about 60 to 100 psig. This will of course vary depending on flow rate and reaction temperature.

The present invention will be further appreciated in light of the following examples which disclose formation of caramel color using the previously described reactor.

EXAMPLE 1

Food grade corn syrup (62DE, 82° Brix) was added to the preheater and heated to about 250° F. It was pumped into the heater at a flow rate of 500 cc per minute and heated to 300° F. Aqua ammonia (29% $NH_4OH$) was injected through the three ammonia injection ports at a rate of 50 cc per minute. The aqueous ammonia had been preheated to a temperature of 330° F. The reaction temperature within the reaction zone reached about 339° F. The reaction pressure was maintained at 100 psig and the reaction time was 12 minutes. The caramel emitted from the gas release valve had a color of 0.086 abs 610 nm at 0.1% w/v; a specific gravity of 1.31, pH of 5.21 and a 4MeI content of 45 ppm. This color was beer and salt stable. In other words, when added to either beer or a concentrated salt solution, it remained dissolved and did not precipitate or cause the beer or salt solution to become murky.

EXAMPLE 2

Food grade corn syrup (62DE, 82 Brix) was added to the preheater and heated to 270° F. and pumped at a rate of 500 cc per minute into the reactor heater. It was heated to 330° F. at a pressure of 95 psig. Aqueous ammonia (29% $NH_4OH$) was preheated to 327° F. and injected through the three ammonia injection ports at a flow rate of 80 cc per minute through each injector. The reaction time was 14 minutes and the produced caramel had a color of 0.105 abs. 610 nm at 0.1% w/v. The specific gravity was 1.31 and pH 4.41 with 4MeI content of 54 ppm. Again this is beer and salt stable.

EXAMPLE 3

An alternate method of practicing the present invention is to first run the syrup through the reactor adding all the requisite catalyst in a first pass. Thereafter, to develop further color, the syrup is again passed through the reactor without adding further catalyst. The syrup is heated under pressure, mixed with catalyst and cooled in the first pass. It is then heated and cooled again in the second pass where the color forming reaction is completed. In this example, food grade corn syrup (62DE, 82° Brix) was added to the preheater and pumped at a rate of 500 cc per minute into the reactor heater where it was heated to 330° F. and then passed into the reactor zone. Aqua ammonia (29% $NH_4OH$) was heated to 326° F. and injected into the reaction zone at a rate of 125 cc per minute. On the first pass it was reacted 13 minutes to produce a caramel color after the first pass of 0.11 abs 610 nm at 0.1% w/v with a specific gravity of 1.27 and a pH of 6.3 with 218 ppm of 4MeI. This solution was cooled to ambient temperature and passed again through the reactor. In this second pass the flow rate was 1,000 cc per minute and the reaction temperature was 302° F. The reactor pressure was maintained at 65 psig and the reaction time was 6.5 minutes. Caramel properties were color 0.13 abs 610 nm at 0.1% w/v specific gravity 1.264, pH 5.0 4MeI content 210 ppm. This again was beer and salt stable.

According to this last example the color content of the caramel color is increased by cooling the catalyst syrup mixture prior to total formation of color and subsequently reheating the catalyst syrup mixture. This permits the formation of a deeper color without excessively increasing the 4MeI content relative to the color intensity.

In all of these examples the THI content, which is generally related to the 4MeI content, should be less than 60 ppm with color intensity of less than about 0.1 abs at 610 nm, and generally below 20 ppm at about 10-15 ppm. Using prior art methods frequently produces caramel with THI contents in excess of 100 ppm in such a color concentration. Moreover, hazing did not occur in any of the examples.

The caramelization reaction once started is exothermic and temperature control is required. Preferably the temperature of the reacting syrup catalyst mixture is controlled by controlling the pressure via valve 51. The temperature could also be controlled by cooling the reaction tubes. This is less preferred because a temperature differential is created within the reaction tube. This tends to increase 4MeI and THI content.

The above methods provide a low cost, rapid method of producing ammonia caramel while reducing the 4MeI or THI content. Thus the present invention provides a quick simple method of producing ammonia caramel.

The present invention can also be practiced using high solids content syrup with anhydrous ammonia. This modification disclosed in a co-pending application permits formation of a darker color which is clear and salt and beer stable. Accordingly, preferably the solid content of the carbohydrate syrup should be at least about 75% and more preferably the solids content should be 80% or higher. By controlling the water content an improved caramel color is produced.

Accordingly, having described my invention, I claim:

1. A continuous method of preparing ammonia caramel comprising forming a flowing stream of carbohydrate syrup, said syrup comprising water and carbohydrates;

heating said flowing stream of carbohydrate syrup to a temperature above the boiling temperature of said syrup at ambient pressure;

maintaining said stream of syrup at an elevated pressure effective to maintain said water at the liquid state;

introducing an amount of an ammonia caramelization catalyst effective to cause caramelization of said stream at said temperature to form a mixture of syrup and catalyst by introducing less than said amount of catalyst at each of a plurality of locations along said stream;
maintaining said mixture of syrup and catalyst at said elevated pressure for a period of time effective to form caramel coloring.

2. The method claimed in claim 1 wherein said catalyst is selected from the group consisting of ammonia and ammonium hydroxide.

3. The method claimed in claim 2 wherein said temperature is established at at least about 250° F.

4. The method claimed in claim 3 wherein said temperature is established at less than about 360° F.

5. The method claimed in claim 4 wherein temperature is maintained at less than 360° F. by maintaining said pressure at from about 80 to about 100 psig.

6. The method claimed in claim 1 wherein said amount of catalyst is added to said stream before 80% of said period of time.

7. The method claimed in claim 1 wherein said stream is cooled to about 180° F.

8. The method claimed in claim 1 comprising mixing said catalyst with said stream at each of said plurality of injection locations.

9. The method claimed in claim 1 wherein said syrup is selected from the group consisting of corn syrup, sucrose, dextrose, invert sugar, molasses and malt syrup.

10. The method claimed in claim 9 wherein said syrup comprises corn syrup.

11. The method claimed in claim 10 wherein said syrup is food grade corn syrup.

12. The method claimed in claim 1 wherein said period of time is from about 1 to about 100 minutes.

13. The method claimed in claim 12 wherein said catalyst is injected into said stream at three injection locations along said stream;
said injection locations being spaced about 10 feet apart from each other.

14. The method claimed in claim 2 wherein said catalyst is heated to a temperature of at least about 300° F. prior to being added to said stream.

15. A continuous method of forming caramel comprising pumping corn syrup to form a flowing stream of corn syrup;
heating said flowing stream of corn syrup to a temperature of at least about 310° F.;
maintaining said stream at a pressure of at least about 60 psi;
heating a catalyst to about 200° F. said catalyst selected from a group consisting of ammonia and ammonium hydroxide;
adding said catalyst at a plurality of locations along said stream wherein the total amount of catalyst added to said stream is effective to cause caramelization of said syrup at a temperature of about 310° F. and wherein said amount of said catalyst added at any one location is less than the amount of catalyst effective to cause the pH of said syrup to raise above about 7;
mixing said catalyst with said syrup at each of said locations;
maintaining said flowing stream at elevated pressure for about 1 to about 100 minutes to form a caramel color;
cooling said flowing stream to about 180° F. while maintaining said stream at an elevated pressure;
reducing said pressure to ambient pressure and collecting said caramel.

16. The method claimed in claim 15 comprising further heating said collected caramel to a temperature of at least about 310° F. to provide further color formation.

17. A method of forming caramel coloring by reacting a carbohydrate syrup and an effective amount of catalyst selected from the group consisting of ammonia and aqueous ammonium hydroxide comprising heating said syrup to a temperature above the ambient boiling point of said syrup;
heating said catalyst to at least about said temperature;
mixing said heated catalyst with said syrup;
maintaining said syrup with said catalyst at a pressure effective to maintain said syrup in a liquid phase for a period of time effective to cause caramel color formation.

18. The method claimed in claim 17 wherein said catalyst is heated to at least about 300° F.

19. The method claimed in claim 18 wherein a flowing stream of said carbohydrate syrup is formed and said syrup is heated to at least about 300° F. and said catalyst is added to said syrup by introducing less than an effective amount of said catalyst at each of a plurality of locations along said stream.

20. The method claimed in claim 19 wherein said pressure is from about 60 to about 100 psig.

21. The method claimed in claim 19 wherein said effective amount of said catalyst is added to said stream before 80% of said period of time.

22. The method claimed in claim 19 comprising mixing said catalyst with said stream at each of a plurality of injection locations.

23. The method claimed in claim 19 wherein said syrup is selected from the group consisting of corn syrup, sucrose, dextrose, invert sugar, molasses and malt syrup.

24. The method claimed in claim 19 wherein said period of time is from about 1 to about 100 minutes.

25. The method claimed in claim 24 wherein said syrup comprises corn syrup.

26. The method claimed in claim 25 wherein said syrup is food grade corn syrup.

27. The method claimed in claim 26 wherein said stream flows at a rate of from about 500 cc/minute to about 1000 cc/minute.

28. The method claimed in claim 19 wherein said catalyst is injected into said stream at three injection locations along said stream.

29. A continuous method of preparing ammonia caramel having relatively low 4MeI content and which is not hazed;
said method comprising forming a flowing stream of carbohydrate syrup;
heating said flowing stream of carbohydrate syrup to at least about 250° F.;
maintaining said stream of syrup at at least the saturation pressure of said syrup;
introducing an amount of caramelization catalyst effective to cause caramelization of said stream at said temperature to form a mixture of syrup and catalyst by introducing less than said amount of catalyst at each of a plurality of locations along said stream;
said catalyst selected from the group consisting of ammonia and ammonium hydroxide;

maintaining said mixture of syrup and catalyst at said elevated pressure for a period of time effective to form caramel coloring.

30. A method of forming caramel coloring having low 4MeI content by reacting a saccharide syrup and an effective amount of catalyst selected from the group consisting of ammonia and aqueous ammonium hydroxide;

comprising heating said syrup to a temperature above the ambient boiling point of said syrup;
heating said catalyst to at least about 300° F.;
mixing said heated catalyst with said syrup;
maintaining said syrup with said catalyst at at least the saturation pressure for a period of time effective to cause caramel color formation.

* * * * *